UNITED STATES PATENT OFFICE.

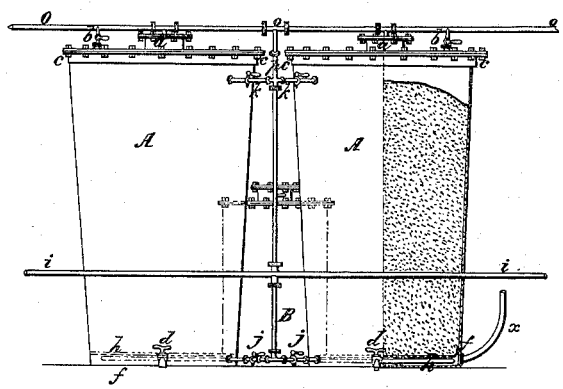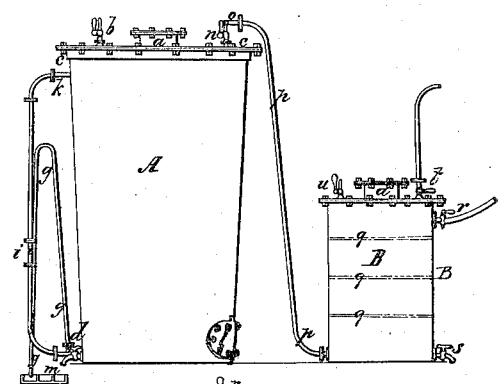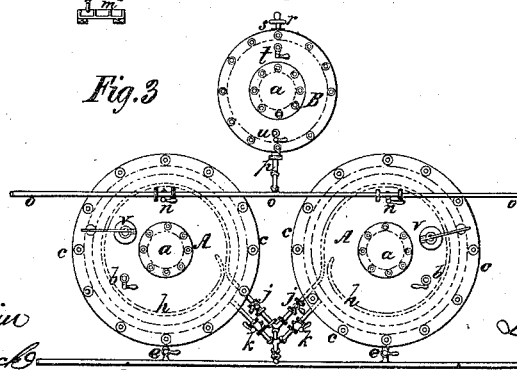

ABSALON H. LEPLAY AND JULIUS F. J. CUISINIER, OF PARIS, FRANCE.

IMPROVEMENT IN REVIVIFYING ANIMAL CHARCOAL FOR REFINING SUGAR.

Specification forming part of Letters Patent No. 35,160, dated May 6, 1862.

*To all whom it may concern:*

Be it known that we, ABSALON HIPPOLYTE LEPLAY and JULIUS FRANCIS JOSEPH CUISINIER, both of Paris, in the French Empire, have invented certain new and useful improvements in revivifying black or charcoal, in collecting ammoniacal gases generated in the revivification, in the clarification of saccharine liquors, and in apparatus employed in the revivification of the black and in the filtering of saccharine liquors; and we hereby declare the following to be a full, clear, and exact description of the same, reference being had to the accompanying drawings, in which—

Figures 1, 2, and 3 represent, respectively, a front elevation, partly in section, a side elevation, and a plan view, of the apparatus hereinafter referred to and described.

Our invention consists, first, in revivifying animal black or charcoal by wet processes, hot water or steam acting in the filtering-vessels, whether for renewing its powers for absorbing lime or for renewing its properties for absorbing azotized, ammoniacal, and coloring matters, as hereinafter described; second, in revivifying animal black by acids to eliminate lime from defecated saccharine liquors, as hereinafter described; third, in the clarification of saccharine liquors, juices, and sirups by means of phosphates, as hereinafter described; fourth, in the different methods of revivification of animal black, hereinafter described, which allow of the collection of the ammonia given off in the revivification.

The object of our invention is to restore to the spent animal black its orignal properties and effect its revivification in the filter in which it has been used.

We have discovered that animal black possesses, first, the property of absorbing lime; and second, the property of absorbing ammoniacal, azotized, odorous, and coloring matters. We have utilized these properties in the application of our invention to saccharine juices and sirups as follows:

We place the black in grains in the ordinary filter before introducing the saccharine liquor, juice, or sirup. We pass boiling water through it, or introduce steam to heat the black and to prevent the coloring of the saccharine liquor to be acted on. We charge the filter with the juice or sirup, and the application of this process of revivification only commences some hours after the working of the filter, when the saccharine liquor ceases to part with its coloring property. It is found that at that moment the black has lost a great portion of its properties for absorbing the azotized ammoniacal odorous matters which are most injurious to crystallization and to the good qualities of ordinary sugar. If the operation be then suspended, it becomes easy to restore to the black its primitive properties. For this purpose filtration must be immediately stopped and the liquor in the filter must be allowed to run out. Then introduce at the lower part of the filter a jet of steam, which penetrates through and between the grains of black. As soon as the steam reaches the upper part of the filter there is given off a strong ammoniacal odor, due to the ammonia derived from the decomposition of the organic azotized matters of the ammoniacal salts removed by the black from the saccharine liquor. The action of the steam is continued until the disengagement of the ammoniacal vapors ceases, generally from fifteen to thirty minutes, according to the size of the filter and the quantity of steam. The decomposition of these matters and the disengagement of the ammoniacal vapors may be facilitated by adding on the filter a few quarts of a milk of lime at the time the saccharine liquor is allowed to flow out through the bottom of the filter.

When closed filters are used, the milk of lime need not be added. A jet of steam may be introduced at the top of the filter to accelerate the flowing out of the saccharine liquor and to prevent the access of air to the filter. By this means, also, the time necessary for the revivification of the black is diminished. While this latter operation is going on portions of the steam become condensed on the bottom of the filter. This condensed water is thick and contains saccharine and foreign matters. This is drawn off and worked up with other impure products. As soon as this revivifying process is complete the filtering of the saccharine liquors is continued as long as the color is satisfactory and the limpidity of the liquor perfect. When the liquor ceases to possess these qualities, the black is revivified, as before, and this may be repeated five or six times, and even oftener, in the same manner and with the same results. The revivification before described only restores to the black its properties of absorbing azotized, ammoniacal, oily, and coloring matters; but when operating upon saccharine matters containing lime—as beet and cane juices—after defecation it often happens that after a certain time, according to the quantity of lime they contain, the black loses its property of absorbing lime, and then it becomes indispensable to restore this property. The feed to the filter must be suspended and the saccharine liquid therein must be allowed to run off, and boiling water must be introduced to eliminate the saccharine liquid with which the black is moistened. This elimination complete, further introduction of boiling water is stopped and water acidulated with hydrochloric acid, making from three to six degrees by the areometer, is admitted; but the quantity of acid varies according to the quantity of lime absorbed by the black. The inlet of acidulated water is stopped and fresh water admitted until the outflowing liquor reddens slightly, if at all, litmus-paper. We then entirely empty the filter of liquid and feed again with the saccharine liquor. It will be understood that by this last revivification the decoloring properties have not been restored to the black. The two revivifications may be carried on one after the other.

In order to increase in animal black the property of absorbing lime and to render the revivifying of this property less frequent, we adopt the following means: The black we found contains a small quantity of phosphate of lime, with two proportions of lime—that is to say, two equivalents or proportions of lime to one equivalent or proportion of phosphoric acid. It is to the presence of this phosphate that the black to a great extent owes its absorbing powers. In order to add to these powers for absorbing lime, we incorporate with it and increase the phosphate of lime, and this by placing the black in grains in contact with a solution of phosphate of lime with one proportion of lime. Instead of phosphate of lime we sometimes use phosphate of magnesia. The quantity of these phosphates capable of absorbing anew lime absorbed by the black will depend upon the density of the solution of the phosphate of lime used to wet the black. Therefore the property of animal black for absorbing lime may be increased or diminished at will by increasing or lessening the density of the solution placed in contact with the black and the time during which it is allowed so to remain. This operation should be performed in the filter, a sufficient quantity of solution of phosphate of lime with one proportion of lime to entirely cover the black being run into it. This solution is allowed to remain in contact with the black for some instants; then it is allowed to run out. It is economical to collect it and use it over again for a similar purpose. In this state and without further preparation or washing the filter is ready to be again used, and its use may be continued until one or other of the absorbing properties of the black, whether for lime or for azotized, ammoniacal, odorous, and coloring matters, be exhausted.

Either process for revivifying the property of animal black for absorbing lime may be substituted the one for the other, according to circumstances; but when operating upon non-saturated defecated juices the soluble-phosphate process is preferred.

Although we prefer hydrochloric acid in the revivifying process hereinbefore described, other acids may be employed—such as sulphuric acid and salts more or less acid—but their action is less perfect. The property of animal black for absorbing lime will continue as long as the black retains the power of absorbing the solution of phosphate with one proportion of lime; but should its power of absorbing azotized, ammoniacal, and coloring matters become weak, notwithstanding the revivifications of steam and milk of lime, its primitive properties may be restored by pouring upon it in the filter, after by repeated washings it has been freed from saccharine matter, a boiling solution of carbonate of soda, or even caustic soda, of from three to six degrees density. We allow the solution to remain in contact with the black for about an hour, and increase its energy, if necessary, by injecting a jet of steam into the lower part of the filter until all trace of ammoniacal vapor disappears. We allow the solution of soda to run off, and inject steam to dispel all trace of ammonia. We wash with water to remove all remains of the alkaline solution and apply the solution of phosphate with one proportion of lime, or with the solution of hydrochloric acid. We then resume filtration. During this operation the following has taken place: The azotized matters removed from the saccharine liquors have become transformed, under the influence of the caustic soda or the carbonate of soda, into ammoniacal matters, which the current of steam readily drives off; the soda has also dissolved the coloring and oily matters. Thus the revivification of animal black by the wet process and in the filtering-vessel without recourse to calcination is thoroughly effected.

We have stated these processes of revivification may be carried on in ordinary filters. It will be sufficient to add to the filters at the level of the under side of the false bottom perforated with holes a steam-cock, and to substitute for the cloth generally used on the false bottom a wire-gauze or metallic cloth, the meshes of which are sufficiently fine to prevent the black passing through.

For the easy carrying of these processes into effect, the apparatus invented by us is of the construction and arrangement shown in the accompanying drawings, in elevation, partly in section at Fig. 1, in side elevation at Fig. 2, and in plan at Fig. 3.

A A are conical filters. Two are represented; but any number may be used.

*a* is a man-hole; *b*, air-cock for indicating when the odorous matters are disengaged; *c*, cover kept close by screws or bolts and nuts; *d*, cock for emptying the filter; *e*, siphon-cock; *f*, perforated false bottom covered by metallic cloth; *g*, siphon-pipe for the outflow of the saccharine matter; *h*, coil for sending steam into the bottom of the filter; *i*, steam-supply pipe; *j*, steam-cock for admitting and shutting off steam into and from the coil; *k*, cock for admitting steam into the upper part of the filter; *l*, man-hole for emptying the black; *m*, receiver of the filtered juices or sirups; *r*, safety-valve; *o*, pipe communicating with all the filters and leading the gases through a pipe, *p*, into a saturator.

B is the saturator; *n*, cock for the outlet of the gases from the filter; *q q*, perforated diaphragms fixed in the saturator; *r*, pipe for letting water into the saturator; *s*, outlet-pipe from saturator; *t*, gas and vapor outlet pipe and cock; *u*, air-cock. The supply of matter to be filtered, as also the steam, may be admitted either at the upper or lower part of the filter.

In the drawings, a tube, *x*, adapted to each filter A A, indicates the arrival of juice at the lower part of the filter.

The foregoing arrangement allows of the introduction at will of steam. The closed filter also allows of directing and gathering the ammoniacal vapors, which might also prove injurious if allowed to circulate in the factory, in a pipe placed on the top of the filter and made to dip into vessels containing water acidulated with hydrochloric or other acid. If after many successive revivifications by steam the filtration should become slow, we take out the black from the filter and thoroughly wash it. Then, without further treatment, replace it in the filter.

*Employment of animal black in powder.*—This is chiefly used in the refining of sugar, yet treated and used in these processes for the manufacture of sugar it acquires increased importance. The application of these processes in agricultural distilleries requires a considerable supply of water, which the agriculturist may not have at command; and should he prefer using his black as manure, instead of revivifying it, it will be useful to him to obtain the greatest amount possible from the absorbing and discoloring properties of the black. Now, by a complete transformation of the black we greatly increase its powers of absorption, and at the same time reduce the quantity used. Thus we take three parts of phosphate of lime, with one proportion of lime, dissolved in water, and mix the solution with finely-powdered animal black. The phosphate of lime with three parts of lime, which constitutes the base of animal black, is destroyed, and a mixture is obtained containing phosphate with one proportion of lime and phosphate with two proportions of lime. (This phosphate with two proportions of lime, which is insoluble in water, becomes soluble in a solution of phosphate, with one proportion of lime.) The proportion of the one or the other may be increased at will, according as it is desired to increase or diminish the relative quantity of the two compositions. The absorbing property for lime will be as much greater as the quantity of phosphate with one proportion of lime is greater. If this mixture be diluted with water, so as to render it fluid, and if it be poured gradually and cautiously on defecated beet-juice an abundant gelatinous precipitate will be formed on the bottom of the vessel, carrying down with it the black, absorbing the lime in the juice, and decolorizing and clarifying the juice. This precipitate is the phosphate of lime with three proportions of lime, which possesses the property of precipitating itself in a gelatinous form, which contributes to the clarification of the juice to the separation of the black and of all the matters in suspension in a remarkable manner. If the addition of this semi-fluid mixture be continued and the mixture be well stirred into the juice, the latter will soon lose the whole or the greater part of its alkalinity, which is ascertained by testing with litmus-paper, and the result will be a decolorized and clarified juice free, or nearly so, of lime. This operation should take place upon the clear juice as soon as it comes out of the defecating-vessel. It does not require reheating. After having been treated as last described the juice is allowed to settle some minutes and then drawn off clear. The deposit is received in a filter, or undergoes other means of mechanical separation. The juice thus filtered may be baked directly, or it may be passed through animal black in a granular state, according to the quality of sugar desired. The absorbing and decolorizing properties of the black have been completely exhausted, and it may then be advantageously used as manure. It may be utilized in the preparation of phosphate of lime, with one proportion of lime, after having been calcined in the open air. Even in case of need it may be regenerated by boiling it with a solution of caustic soda, and after several washings revivifying it by the solution of phosphate with one proportion of lime.

*Clarification of saccharine liquors in sugar-houses, and particularly in refineries.*—The gelatinous precipitate, hereinbefore referred to, with a base of phosphate with three proportions of lime, when added to a saccharine liquor containing lime, takes the place, and we use it instead of, albumen and blood, generally used in sugar-refineries. Care must, however, be taken not to use it in excess. The black has a very active decolorizing action, owing to the state of extreme division in which it is used. When the quantity of the phosphate is sufficient, the whole is carried to the boiling-point, skimmed, and filtered in the ordinary manner. The phosphate with one proportion of lime may be prepared by burning at a white heat the animal black in contact with the air and by treating the calcined product with two proportions of sulphuric acid. The phosphate with three proportions of lime becomes destroyed, two proportions of sulphate of lime become formed and precipitated, and one proportion remains in solution. This solution may be employed as it is, or it may be concentrated to eliminate a little of the sulphate of lime. We sometimes prepare the soluble phosphate with one proportion of lime with animal black in grain or in powder by adding the same quantity of sulphuric acid. The sulphate of lime carries down the black in precipitating. The phosphate of lime remains still with one proportion of lime, and is dissolved.

Having thus fully described our invention, we shall state our claims, as follows:

1. The method herein described of revivifying animal black or charcoal by hot water or steam, in combination with milk of lime used in the filtering-vessels, substantially in the manner and for the purposes set forth.

2. The method described of clarifying saccharine liquors, juices, and sirups by means of phosphates, substantially as hereinbefore set forth.

3. The manner of operating and effecting, by means of the different processes described, the revivification of animal black or charcoal, so as to allow of the collection of the ammonia given off in the revivification.

In testimony whereof we have signed our names to this specification before two subscribing witnesses.

A. H. LEPLAY.
J. F. J. CUISINIER.

Witnesses:
GEO. HUTTON,
L. CLAËR.